Patented Mar. 10, 1942

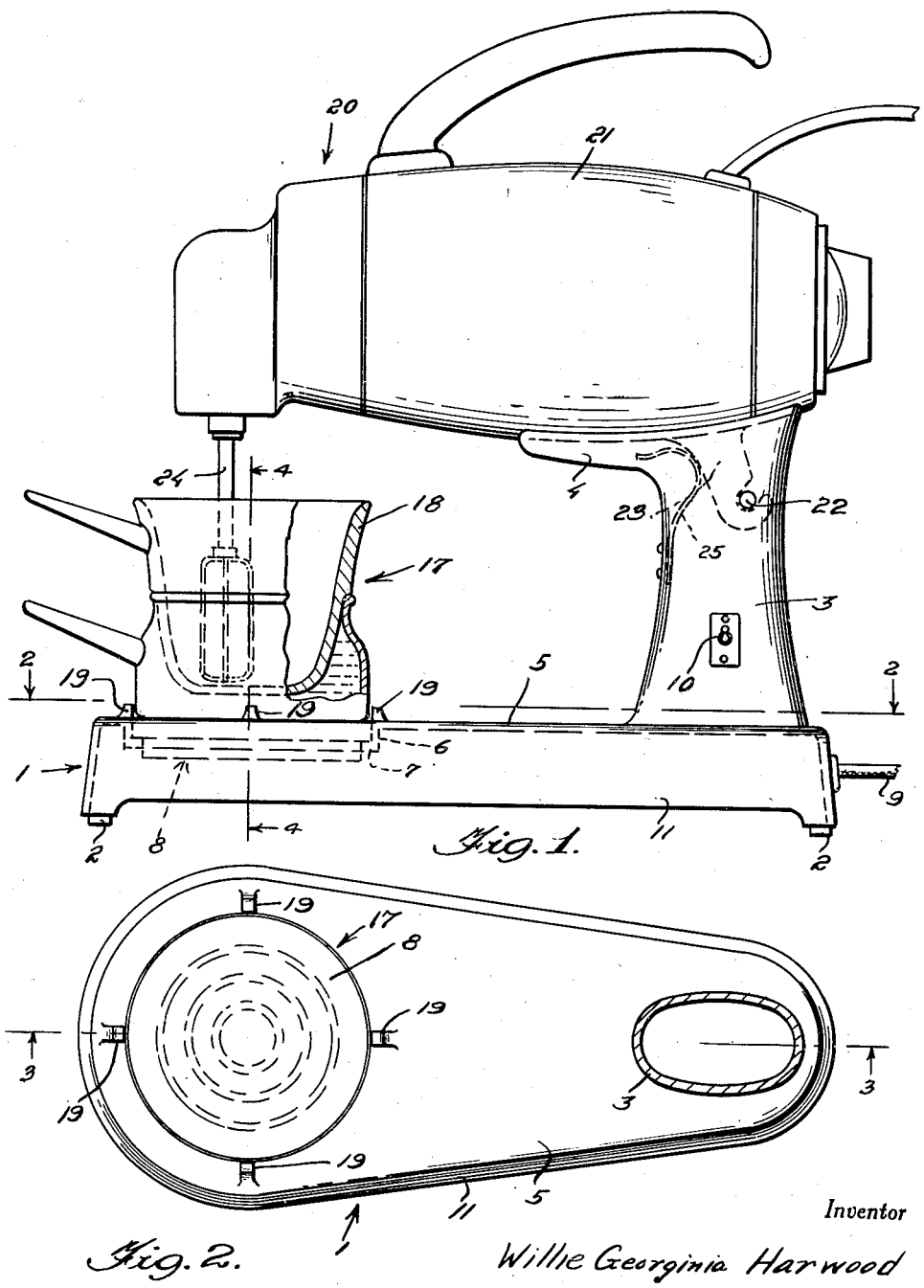

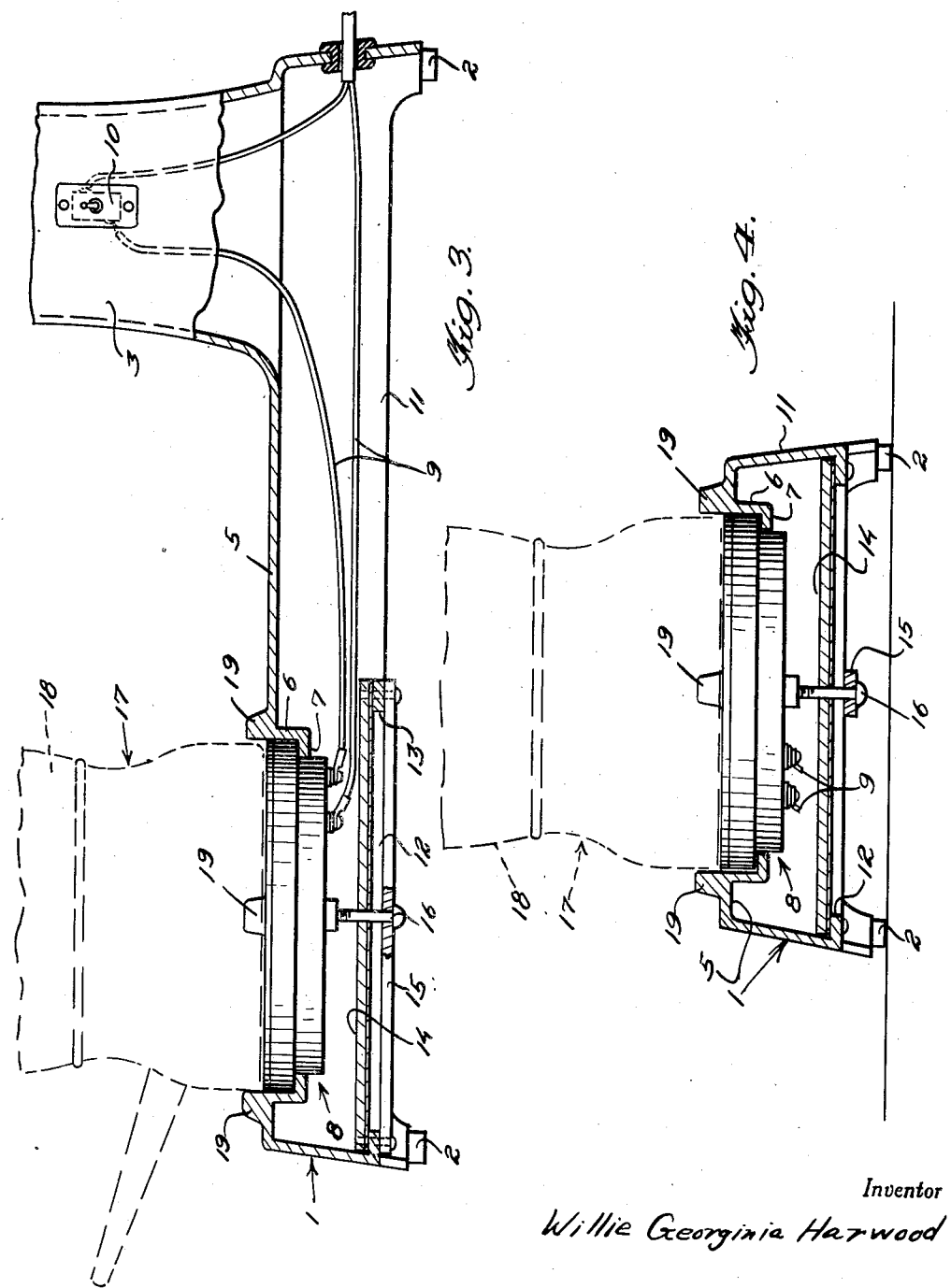

2,275,901

UNITED STATES PATENT OFFICE 2,275,901

APPARATUS FOR PREPARING FOODS

Willie Georginia Harwood, Dickinson, Tex., assignor of one-half to Henry Redman Harwood Application November 2, 1940, Serial No. 364,077

3 Claims. (Cl. 219—43)

The present invention relates to new and useful improvements in apparatus for preparing foods and has for its primary object to provide, in a manner as hereinafter set forth, a device of this character embodying a novel combination and arrangement whereby cake frostings and other foods or products may be stirred while being cooked.

Another very important object of the invention is to provide, in an apparatus of the aforementioned character comprising an electric heating unit and an electric mixed mounted thereon, novel means whereby said mixer may be expeditiously removed when desired.

Other objects of the invention are to provide an apparatus for preparing foods which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a device constructed in accordance with the present invention, a portion of the double boiler being broken away in section.

Figure 2 is a view in horizontal section, taken substantially on the line 2—2 of Figure 1.

Figure 3 is a view principally in vertical longitudinal section through the lower portion of the device, taken substantially on the line 3—3 of Figure 2.

Figure 4 is a cross sectional view, taken substantially on the line 4—4 of Figure 1.

Referring now to the drawings in detail, it will be seen that the embodiment of the invention which has been illustrated comprises an elongated base 1 of suitable material, said base being of hollow construction. Feet 2 are provided for the base 1. As best seen in Figure 2 of the drawings, the base 1 is substantially ovate in plan. Rising from the small end portion of the base 1 is an integral standard 3. The standard 3 is also of hollow construction and communicates with the hollow base 1. At its upper end, the standard 3 is formed to provide an enlarged seat or platform 4 the purpose of which will be presently set forth.

The top 5 of the hollow base 1 has formed integrally therewith a depending ring or annulus 6 provided, on its lower end, with an internal flange 7. The ring 6 defines a circular opening in the large end portion of the base 1 for the reception of an electric hot plate or unit 8 which rests on the flange 7. Electric conductor wires 9 are connected to the unit 8. A control switch 10 on the standard 3 is interposed in the electric circuit of the unit 8. It will be noted that the hollow base 1 and standard 3 accommodate the conductor wires.

The skirt 11 of the hollow base 1 is provided, on its lower portion, with an inturned flange 12 in the large end portion of said base. Extending across the skirt 11 at the ends of the flange 12 is a bar 13. Mounted on the flange 12 and the bar 13 is a shield 14 of asbestos or other heat insulating material which is located beneath the unit 8 for protecting the surface on which the device may be mounted against heat from said unit 8. Extending between the flange 12 and the bar 13 is a longitudinal bar 15. Journaled in the bar 15 is a screw 16 which is threaded into the unit 8 for anchoring same in position, said screw passing through the shield 14.

The reference numeral 17 designates generally a double boiler in position on the unit 8. The pot 18 of the double boiler 17 is formed to provide rounded inside corners to facilitate thorough mixing and cleaning. It will also be observed that the pot 18 is provided with a substantially flat bottom to permit said pot to be placed on a flat surface with safety. Integral lugs 19 rise from the top 5 of the base 1 for retaining the double boiler 17 in position on the unit 8.

The reference numeral 20 designates an electric mixer which is removably mounted on the standard 3. The motor 21 of the mixer 20 is adapted to rest on the seat 4. The seat 4, it will be noted is shaped to accommodate the rear portion of the electric motor 21 which engages said seat. Mounted transversely in the upper portion of the hollow standard 3 is a rod 22. A hook 23 extends from the rear portion of the electric motor 21 and is engaged with the rod 22 for removably securing the mixer 20 in position on the standard 3. The construction and arrangement is such that the mixer 20 projects forwardly over the unit 8. Depending from the forward end of the mixer 20 is an agitator or beater 24 which is operable in the pot 18 of the double boiler 17.

It is thought that the operation of the device will be readily apparent from a consideration of the foregoing. Briefly, the food to be prepared is placed in the pot 18 of the double boiler 17 and said double boiler, with the mixer 21 removed, is positioned on the unit 8, after which the control switch 10 is closed. The mixer 20 is then mounted on the standard 3 with the agitator or beater engaged in the pot 18. The electric motor 21 is then energized for actuating the agitator or beater 24. It will thus be seen that the food or other product in the pot 18 will be simultaneously cooked and stirred. The mixer 20 is removed from the standard 3 by swinging the forward end of the motor 21 upwardly thereby disengaging the hook 23 from the rod 22. Of course, to replace the mixer 20, this operation is reversed. A spring 25 is mounted in the upper portion of the hollow standard 3 and engaged with the hook 23 for yieldingly securing the mixer against forward movement in a manner to accidentally disengage the hook from the rod 22.

It is believed that the many advantages of an apparatus for preparing foods constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. In an apparatus for preparing foods, a base having a standard rising therefrom and provided with a transverse rod and a seat above said rod, a mixing device engaging said seat and provided with means engageable with said rod for detachably securing the mixing device in engagement with said seat, said base, remote from said standard, having an opening therein to accommodate an electric heating unit and a downwardly depending flange at the edge of the base defining said opening, a shield of heat-insulating material mounted on the base at a point spaced downwardly from the top of the base and substantially in alignment with said opening to provide a rest for an electric heating unit placed within said opening, and supporting means mounted on said base for said shield and including means extending upwardly through the shield for engagement with an electric heating unit placed within said opening to secure the same in a position of rest above said shield.

2. In an apparatus for preparing foods, a base having a standard rising therefrom, said standard being substantially hollow and provided at the upper end thereof with an integral seat, and internally thereof, and spaced downwardly from said seat with a transverse rod, and an electric mixer embodying a part adapted to engage on said seat, and a hook associated with said part extending downwardly into the hollow of said standard and engageable with said rod.

3. In an apparatus for preparing foods, a substantially hollow base provided in the topside thereof with an opening for accommodating an electric heating unit, said base having at the edge thereof defining said opening a depending annulus provided on its lower edge with an inturned flange to provide a seat for an electric heating unit placed within said opening, a shield positioned within the hollow of said base below said flange and in substantial alignment with said opening, and rigid supporting means for said shield provided in the hollow of said base within which said shield is seated.

WILLIE GEORGINIA HARWOOD.